E. W. COOKE.
DEHYDRATING APPARATUS.
APPLICATION FILED MAY 27, 1905.

1,080,198.

Patented Dec. 2, 1913.

WITNESSES:

INVENTOR
Ernest W. Cooke,
BY Howard A. Coombs
his Attorney

UNITED STATES PATENT OFFICE.

ERNEST WILLIAM COOKE, OF NEW YORK, N. Y., ASSIGNOR TO COKEL COMPANY, A CORPORATION OF NEW JERSEY.

DEHYDRATING APPARATUS.

1,080,198.   Specification of Letters Patent.   Patented Dec. 2, 1913.

Application filed May 27, 1905. Serial No. 262,618.

*To all whom it may concern:*

Be it known that I, ERNEST WILLIAM COOKE, citizen of the United States, residing at New York, in the county of New York and State of New York, have invented new and useful Improvements in Dehydrating Apparatus, of which the following is a specification.

My invention relates to apparatus for dehydrating animal and vegetable substances and is more particularly designed for the dehydration of succulent food products, although it is not in any way limited thereto.

I have found that in order that succulent food products may be dehydrated without injuring the structure or texture thereof, so that they can afterward be perfectly restored to their original undehydrated condition by the simple addition of water, it is essential to pass air under more or less pressure, and usually air which has itself been previously dried by suitable air drying means or materials entirely through said products alternately from opposite sides.

The term "air" is used herein as meaning atmospheric air or any other suitable vapor or gas.

The object therefore, of my present invention is to provide an apparatus by the use of which the process outlined above can be successfully and conveniently carried out.

Figure 1:
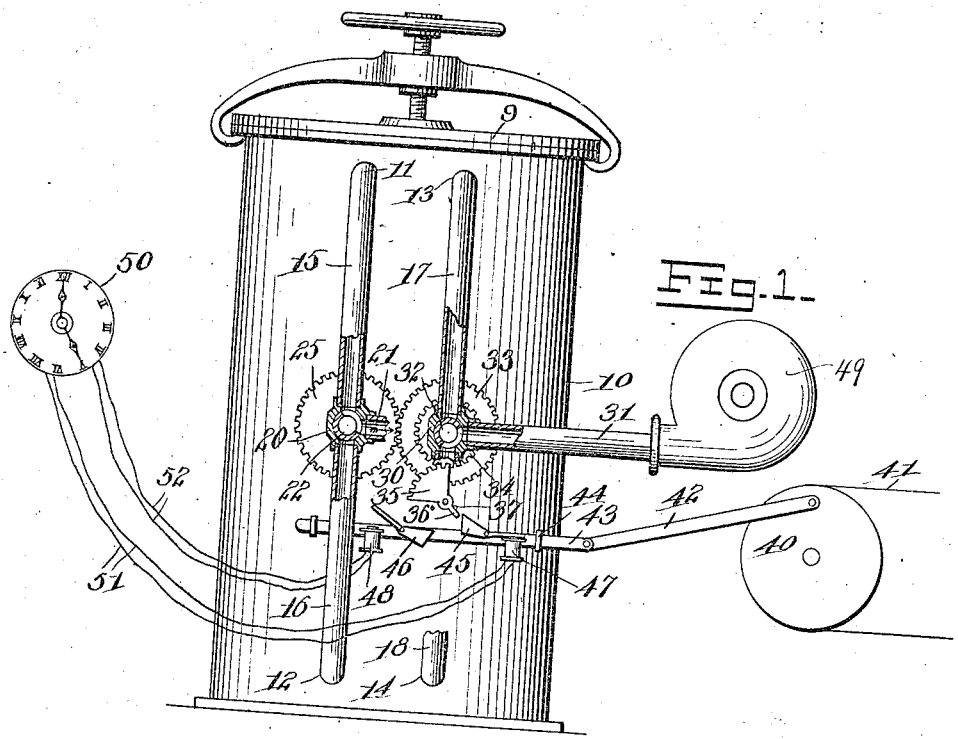
Figure 2:
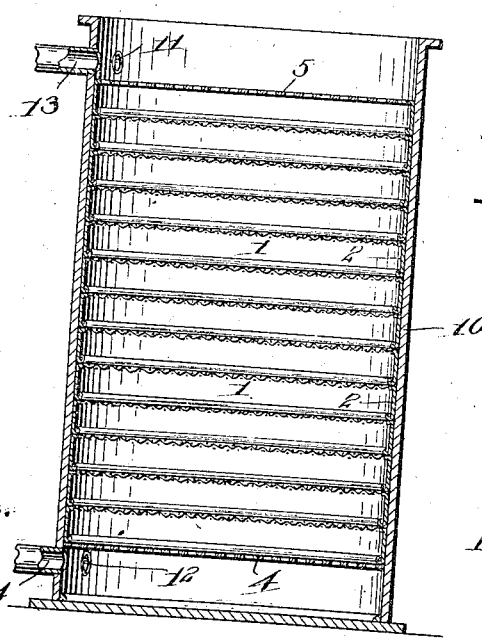

In the said drawing—Figure 1 is a side elevation of my invention, part of the piping being sectioned to show the construction of the valves, and Fig. 2 is a central vertical section of Fig. 1, with certain parts omitted.

In these figures, 10 represents a casing or receptacle in which the substances are treated, the same being closed at the bottom and provided with a removable cover 9, secured by the clamping means shown, or otherwise.

The substance to be treated is placed usually as a granular pervious layer on trays 1, which rest one upon another by their flanges 2, and are provided with floors of wire-mesh 3, or other reticulated or perforated material, suitable to support the products to be treated while allowing the air to pass through from one end of the casing to the other.

Perforated plates 4 and 5 are provided below and above the tier of trays for the purpose of rendering the flow of air uniform and thoroughly diffusing the air over the entire surface of the products. The lower plate 4 may remain permanently in the casing or receptacle, although preferably it is removable, while the upper plate 5 which is necessarily removable may rest on the uppermost tray, as shown. It will be obvious that, when products are to be placed in the casing or receptacle, the cover 9 is taken off, the trays inserted one after the other and finally the plate 5. To remove the trays the proceeding is reversed.

At each end of the casing or receptacle 10 are provided an air-inlet and an air-outlet. The air outlet at the top is indicated by 11, and that at the bottom by 12, while the air-inlet at the top is marked 13 and that at the bottom 14. From the outlet 11, a pipe 15 extends downwardly to a valve 20, arranged adjacent the side of the receptacle, while a similar pipe 16 extends upwardly from the outlet 12 to the said valve. Similar pipes 17 and 18 connect the inlets 13 and 14 to the valve 30, arranged similarly to the valve 20.

An air supply pipe 31 leads to the valve 30 and an air exhaust pipe 21 leads from the valve 20. The said valves contain cylindrical or conical plugs 22 and 32 respectively, provided with passages, which are adapted to place either the pipe 17 or the pipe 18 in communication with the air supply pipe 31, and either the pipe 15 or the pipe 16 in communication with the air exhaust pipe 21.

The valve plugs 22 and 32 are connected to turn simultaneously by the gears 25 and 33, which at the same time permit the relative angular positions of the plugs to be varied by slipping said gears out of mesh and rotating one of them and its connected valve plug through the space of one or more teeth.

It will be seen that with the valves in the position shown in the drawing, air forced in at 31 as by the fan shown at 49, will pass through the pipe 17 and enter the receptacle at the top, it being then obliged to pass downwardly through the trays since the only egress available is at 12, from thence through pipe 16 and finally through valve 20 to the exhaust pipe 21.

I provide means to be described for intermittently turning the valves so that the air entering at 31 is forced to pass down through pipe 18 instead of up through pipe 17 enters the receptacle at 14, is forced upwardly through the trays and passes out at 11 through pipe 15 to the valve 20 and exhaust pipe 21.

In order to get the best results in dehydrating succulent food products it is generally necessary to retard the flow of the air so as to cause it to be under a greater pressure than it otherwise would be under and thereby thoroughly permeate the pores, or spaces between the cells of the products, and this is accomplished by adjusting the outlet valve 20 so that the passage therein is not opened as widely as the passage in the inlet-valve 30. By the arrangement described any relative angular adjustment of the valve plugs can be obtained. In practice air under some degree of pressure is found to produce an evener and more perfect drying of succulent food materials.

My invention includes automatic mechanism for periodically rotating the valve plugs at predetermined intervals of time to reverse the flow of the air.

The mechanism shown, by way of example only, consists of the following parts: A crank-disk 40, driven by a belt 41 from any source of power, reciprocates by means of the connecting rod 42, a bar 43, mounted in suitable guides 44, which may project from the receptacle 10 or be otherwise supported. The bar 43 carries a pair of oppositely facing pivoted pawls 45 and 46, adapted to be raised into operative position by magnets 47 and 48, carried by said bar, the circuits 51 and 52 of said magnets being closed at predetermined intervals by a suitable timing mechanism, herein illustrated diagrammatically as a clock 50. The magnets are arranged to attract the tails of the pawls, the front ends of the latter being heavier, so that they fall to inoperative position when the magnets are deënergized. Attached to one of the valve plugs, as 32, is a spur-gear 34, somewhat smaller than the gear 33, and a segment-gear 35 is mounted so as to mesh with said gear 34. The segment-gear is provided with a tail 36, which is adapted to be engaged by the pawls 45 and 46, when they are raised into operative position by the magnets. Suitable stops 37 are provided to prevent said segment from slipping out of mesh with the gear 34.

In dehydrating succulent vegetable foods by the present apparatus they are desiccated in such a manner as to lose only what is, so to speak, the water mechanically present without losing water chemically present as water of constitution or the volatile oily bodies which give the aroma and taste to ordinary foods, so that such dehydrated bodies on re-hydration by treatment with water will reassume the condition of the original material.

Having thus described my invention but without limiting myself to the exact form of apparatus shown, what I claim is:

1. A dehydrating apparatus comprising a closed receptacle adapted to receive the substance to be treated, air-forcing means for creating a current of air, connections leading from said means to two opposite ends of the receptacle, timing means and means controlled by said timing means for periodically diverting the flow of air from each of said connections to the other.

2. A dehydrating apparatus comprising a closed receptacle adapted to receive the substance to be treated, air-forcing means for creating a current of air, valved connections leading from said means to two opposite ends of the receptacle, and automatically controlled means for controlling the flow of air through the valves of said connections to intermittently reverse the direction of flow of the air through the receptacle.

3. A dehydrating apparatus comprising a closed receptacle for the substances to be treated, means to create a current of air, means to convey said air into and out of said receptacle, and automatically and periodically controlled valve mechanism in said air-conveying means, and means controlling said valve mechanism to automatically and to periodically reverse the direction of the current of air in said receptacle.

4. A dehydrating apparatus comprising a closed receptacle adapted to receive superimposed trays containing the substances to be treated, an air-inlet and an air-outlet at each end of said receptacle, a valve to which said air-inlets are connected and a second valve to which said air-outlets are connected, an air supply pipe leading to said first-mentioned valve and an air-exhaust pipe leading from said second valve, and means to periodically actuate said valves to reverse the direction of flow of the air through the receptacle.

5. A dehydrating apparatus comprising a closed receptacle adapted to receive superimposed trays containing the substances to be treated, an air-inlet and an air-outlet at each end of said receptacle, a valve to which said air-inlets are connected and a second valve to which said air-outlets are connected, an air supply pipe leading to said first-mentioned valve and means to automatically actuate said valves at predetermined intervals of time to reverse the direction of flow of the air through the receptacle.

6. A dehydrating apparatus comprising a closed receptacle to receive the substances to be treated, two air-pipes each communicating with the opposite ends of said receptacle, valves in said pipes, means to force air into one of said pipes and means to periodically actuate said valves to reverse the flow of the air through the receptacle.

7. A dehydrating apparatus comprising a receptacle adapted to contain the substances to be treated, piping and valves constructed and arranged to convey a current of air through said receptacle from end to end, a continuously moving actuating member, pawls carried thereby in normally inoperative positions but adapted when in operative positions to actuate said valves to reverse the direction of flow of the air through said receptacle, magnets carried by said member and adapted when energized to move said pawls into operative positions and a timing mechanism to control the circuits of said magnets.

8. A dehydrating apparatus comprising a closed receptacle adapted to receive trays containing the substances to be treated, means to admit air into either end of said receptacle, and means to remove it from either end thereof, said last mentioned means being constructed and arranged to retard the flow of the air and thereby maintain it under a certain pressure, and means to intermittently change the direction of flow of the air through said receptacle.

9. A dehydrating apparatus comprising a closed receptacle adapted to receive trays containing the substances to be treated, means to admit air into either end of said receptacle, and means to remove it from either end thereof means to diffuse the entering air over the entire superficial area of the trays and means to reverse the direction of flow of the air at predetermined intervals of time.

10. A dehydrating apparatus comprising a closed receptacle adapted to receive trays containing the substances to be treated, means to admit air into either end of said receptacle, and means to remove it from either end thereof, valves to control the flow of the air through said receptacle, means to simultaneously actuate said valves to reverse the direction of flow, and means to diffuse the entering air over the entire superficial area of the trays.

11. A dehydrating apparatus comprising a closed receptacle adapted to receive a superimposed series of perforated trays containing the substances to be treated, an air-inlet and an air-outlet pipe communicating with each end of said receptacle, means to force air into said receptacle at one end and out from the other, and means to periodically reverse the direction of the air passing through said receptacle.

12. A dehydrating apparatus comprising a receptacle adapted to receive substances to be treated, a connection to each end adapted to serve as an inlet for air, means for supplying air to such inlets, a connection at each end to serve as an air outlet, suitable valves for the outlet connection and for the inlet connection and means for simultaneously opening valves to permit inflow of air through an inlet at one end of said receptacle and outflow through an outlet at the other end.

13. A dehydrating apparatus comprising a receptacle adapted to receive substances to be treated, a connection to each end adapted to serve as an inlet for air, means for supplying air to such inlets, a connection at each end to serve as an air outlet, suitable valves for the outlet connection and for the inlet connection and means for simultaneously opening valves to permit inflow of air through an inlet at one end of said receptacle and outflow through an outlet at the other end while closing valves of an outlet at the inflow end and of an inlet at the outflow end.

14. A dehydrating apparatus comprising a receptacle adapted to receive substances to be treated, a connection to each end adapted to serve as an inlet for air, means for supplying air to such inlets, a connection at each end to serve as an air outlet, a valve adapted to alternately open and close each inlet connection, a valve adapted to alternately open and close each outlet connection and means for coupling the valves in such manner as to permit inflow at one end of said receptacle and outflow at the other while closing the other inlet and outlet.

15. An alternating air current apparatus for dehydrating succulent vegetables comprising a receptacle for such foods, an air inlet and an air outlet at each end, a source of air under pressure, valved means for supplying air from such source to each of said inlets, the connections between such source and such inlets being of the same type so that air of the same character may be fed to each end in alternation, valved means for controlling such outlets and valve-connecting means for simultaneously opening an inlet at one end and an outlet at the other while closing the other outlet and inlet.

In testimony whereof I affix my signature, in presence of two subscribing witnesses.

ERNEST WILLIAM COOKE.

Witnesses:
 Thos. D. Rombout,
 S. E. Sinnigar.